United States Patent [19]

Robertson, Jr. et al.

[11] 4,456,865
[45] Jun. 26, 1984

[54] HIGH TORQUE SERVO POSITIONER USING 3 PHASE VARIABLE FREQUENCY CONSTANT TORQUE CONTROLLER

[75] Inventors: John W. Robertson, Jr., Willowick; James M. Smith, Eastlake, both of Ohio

[73] Assignee: The Babcock & Wilcox Company, New Orleans, La.

[21] Appl. No.: 370,702

[22] Filed: Apr. 22, 1982

[51] Int. Cl.³ ............................................. G05B 11/28
[52] U.S. Cl. .................................. 318/599; 318/811; 318/341; 318/810
[58] Field of Search ................. 318/811, 810, 341, 599

[56] References Cited

U.S. PATENT DOCUMENTS

| | | | |
|---|---|---|---|
| 3,387,205 | 6/1968 | Tesdall | 318/434 X |
| 4,099,109 | 7/1978 | Abbondanti | 318/722 X |
| 4,201,936 | 5/1980 | Roumanis | 318/341 |
| 4,337,429 | 6/1982 | Stuart | 318/811 |
| 4,387,421 | 6/1983 | Zach et al. | 318/811 X |
| 4,409,534 | 10/1983 | Bose | 318/811 |

*Primary Examiner*—B. Dobeck
*Attorney, Agent, or Firm*—Vytas R. Matas; Robert J. Edwards

[57] ABSTRACT

A controller for an induction motor used as a servo positioner comprises a position control module including a microprocessor with memory for generating a plurality of pulse width modulated waveforms. The module includes an analog to digital converter for converting one of four analog signals into digital signals readable by the microprocessor. The analog signals correspond to a gain signal, a feedback signal, a set point signal and a dead band signal. The module also receives digital signals for programming purposes. The microprocessor is programmed to initialize conditions and convert the analog signals.

The module is included in a three phase drive controller which has drivers connected to the module for receiving the waveforms and generating corresponding AC inputs to the three phase motor. An overcurrent detector is provided for sensing overcurrents in the AC signals and for generating an interrupt signal which is applied to the module for interrupting the function thereof. The module according to its programming can be placed in one of three modes for interface with a broad spectrum of automatic control systems. The modes include automatic-analog, automatic-pulse, and closed-contact controls.

1 Claim, 9 Drawing Figures

HIGH TORQUE SERVO POSITIONER USING 3 PHASE VARIABLE FREQUENCY CONSTANT TORQUE CONTROLLER

TECHNICAL FIELD

The present invention relates in general to servo positioners and in particular to a new and useful method and apparatus for controlling a three phase induction motor.

BACKGROUND ART

Previous devices and methods of positioning elements such as valves, utilize a DC motor controller and a DC motor to develop the required torque necessary to position the mechanical load. Time proportional control of an induction motor using magnetic contactors is another known method.

The inventive device and method uses a three phase variable speed constant torque induction motor controller and a three phase induction motor. The driving element of the servo positioner is an electric motor. Previous technology has dictated that the control of a permanent magnet DC motor is more economical than a three phase induction motor for horsepower ratings below 10. Three disadvantages associated with DC motors are large size for HP rating, necessary routine maintenance, and high cost. An AC three phase induction motor reduces all these disadvantages which are associated with the DC machine. An AC induction motor is approximately ⅓ the size of an equivalent DC motor, 20% of the cost, and requires little or no maintenance due to its having only one moving part.

The disadvantage of an AC induction motor is the increased complexity of the control electronics. Until recently, the control of less than 10 HP induction motors has been uneconomical due to the large number and cost of the associated electronic components. The past few years have shown a significant reduction in cost of power electronics and complex LS1 circuits. The current trend of price reduction is expected to continue as the semiconductor industry improves its processes. Consequently, AC induction control has become more desirable than DC motor control in the 1 to 10 HP range. The proposed application requires a three phase induction motor rated at 3 horsepower or less.

The use of a microprocessor based controller has, according to the invention, in addition, improved the performance and flexibility of the control electronics.

Previous methods of controlling an induction motor utilize analog circuitry consisting of sinusoidal and triangular wave forms which are generated to produce the pulse width modulated wave forms necessary to control the motor for constant torque variable speed control. The analog technique is usually complex, requiring numerous factory and field adjustments.

Digital techniques including microprocessors have been attempted for open loop induction motor speed control.

U.S. Pat. No. 4,099,109 to Abbondanti discloses a digital apparatus for synthesizing pulse width modulated wave forms. According to that reference, however, the wave forms are selected by hardware. The versatility of Abbondanti for adapting the induction motor control to various applications is thus limited. In addition the provisions of the required logic for the induction motor control using hardware limits the flexibility of such control, and the adaptability thereof to various different conditions and requirements.

SUMMARY OF THE INVENTION

The present invention relates to a high torque servo positioner which uses a three phase variable frequency constant torque controller. A three phase induction motor is controlled utilizing a microprocessor.

Additional information which is useful in understanding the present invention can be found in a copending application entitled "Digital Generation Of Three Phase PWM Waveforms For Variable Speed Control Of Induction Motor", filed May 7, 1982 under Ser. No. 06/375,796 which is incorporated here by reference.

DESCRIPTION OF THE PREFERRED EMBODIMENT

Figure 1:
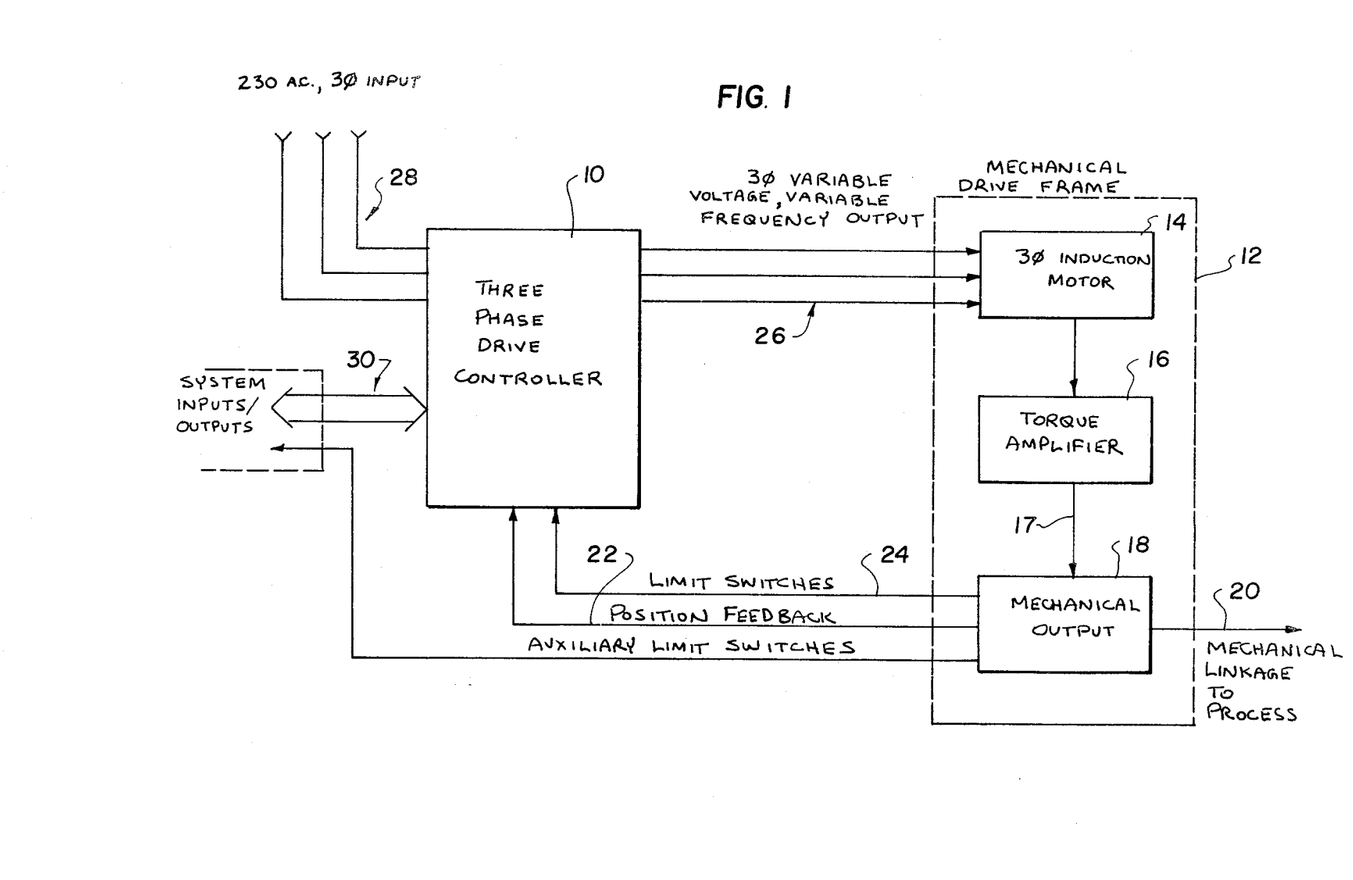
FIG. 1 is a block diagram illustrating the arrangement of components according to the invention.

As shown in FIG. 1, a UE 40/50/60 Universal Electric Control Drive according to the invention, is operable to control the position of dampers, air registers, butterfly valves, or other process control elements which require an external driving device to control their position from a remote location. This is achieved over mechanical linkage 20.

The Universal Electric Control Drive comprises two major elements. The controller 10 is primarily an electrical system which interprets system commands to provide control functions to the drive frame 12. The drive frame 12 is primarily a mechanical system which accepts commands from the controller 10 to accurately position the load.

The control drive is available in three torque ratings: (1) 1000 Ft. Lb., (2) 3300 Ft. Lb., and (3) 5600 Ft. Lb. All three drives are controlled by the Three Phase Controller. The primary difference between models are motor ratings and the mechanical load capacity of the frame 12.

The drive frame 12 comprises a motor 14, speed reduction mechanism (torque amplifier) 16, and electrical devices 18 for providing feedback information.

The drive frame is physically located at the controlled process. Consequently, all components with the drive frame must be rugged and capable of withstanding harsh environmental conditions.

The control drive uses a standard NEMA B design 3 phase induction motor as the driving power element 14.

Induction motors are rugged and normally maintenance free. The motor rating is 1, 2, or 3 horsepower depending on torque output requirements. Variable speed and torque control is provided to the motor by the Controller electronics 10.

The high speed, low torque of the motor is converted to a low speed, high torque output through a worm gear and acme screw reduction mechanism (in 16) connected to the drive output shaft 17. The output shaft provides 90° output shaft rotation to position the load. The mechanical design is self-locking which allows the drive to maintain the last position upon loss of power.

A position transmitter and limit switches (in 18) transmit the drive output shaft position to the controller 10. The position transmitter provides a standard 4 to 20 mA current loop signals which corresponds to 0 to 100% of shaft travel. The position signal is transmitted to the Controller via two signal wires at line 22. Four limit switches are located on the drive frame 12 which are activated by adjustable cams mechanically coupled to the output shaft position. Two limit switches are dedicated to the Controller over line 24, for end of travel warning. Activation of either switch disables the applied power and stops the drive. The two remaining switches are for other possible applications (not shown).

The three Phase Drive Controller 10 is a closed loop microprocessor based positioning servo device which conrols the drive output shaft position. The controller is physically located in a control cabinet or other protected enclosure which is remote from the drive frame 12. This cabinet mounting enables the controllers for a number of motors to be centrally located and removed from the harsh environment associated with the process. Interconnecting wires 26, 22, and 24 from the controller 10 to the drive frame 12 form motor power, limit switches, and position transmitter current loop interconnections.

The Controller 10 transforms 230 V AC, 3 phase, 60 Hz input power at 28, into a three phase pulse width modulated (PWM) waveform at 26, which is capable of variable voltage and variable frequency control. The PWM waveform is applied directly to the induction motor 14 to provide variable speed and torque control. The PWM waveform generated is determined by the instantaneous digital and analog system inputs to the controller provided at 30. The controller can be operated either by an automatic control system or through raise-lower contact inputs controlled by an operator.

Figure 2:
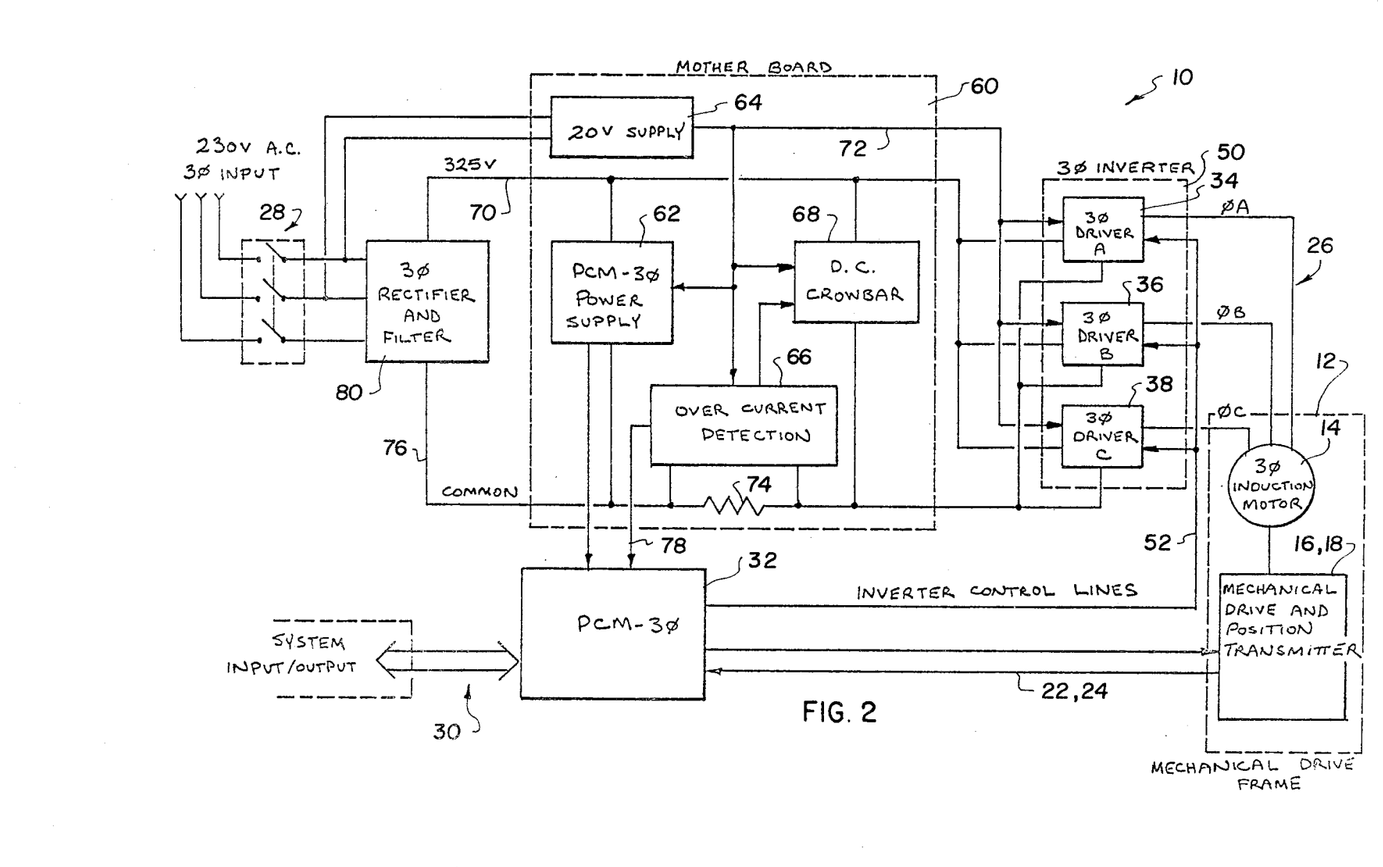
FIG. 2 is a block diagram showing details of the three phase controller of FIG. 1.

The functional block diagram of the complete 3 Phase Drive and control configuration is shown in FIG. 2. The description of the individual function blocks and their interrelation follow.

Position Control Module (PCM) 32 provides the intelligence for the Three Phase Drive Controller 10. The PCM 32 is a self-contained microcomputer which accepts control system and control drive inputs at 30 and, based on those inputs, develops logic level PWM waveforms which are applied to three power switching modules 34, 36, and 38 (Phase Drivers A, B, C).

The PCM 32 uses a MC6802 microprocessor with up to 4K bytes of program storage. The processor is an interrupt driven machine with priority given to updating the real time 3 phase PWM waveform outputs to the induction motor. The remaining processor time is used to check control system inputs, control drive inputs, perform calculations, and display controller status.

Figure 3:
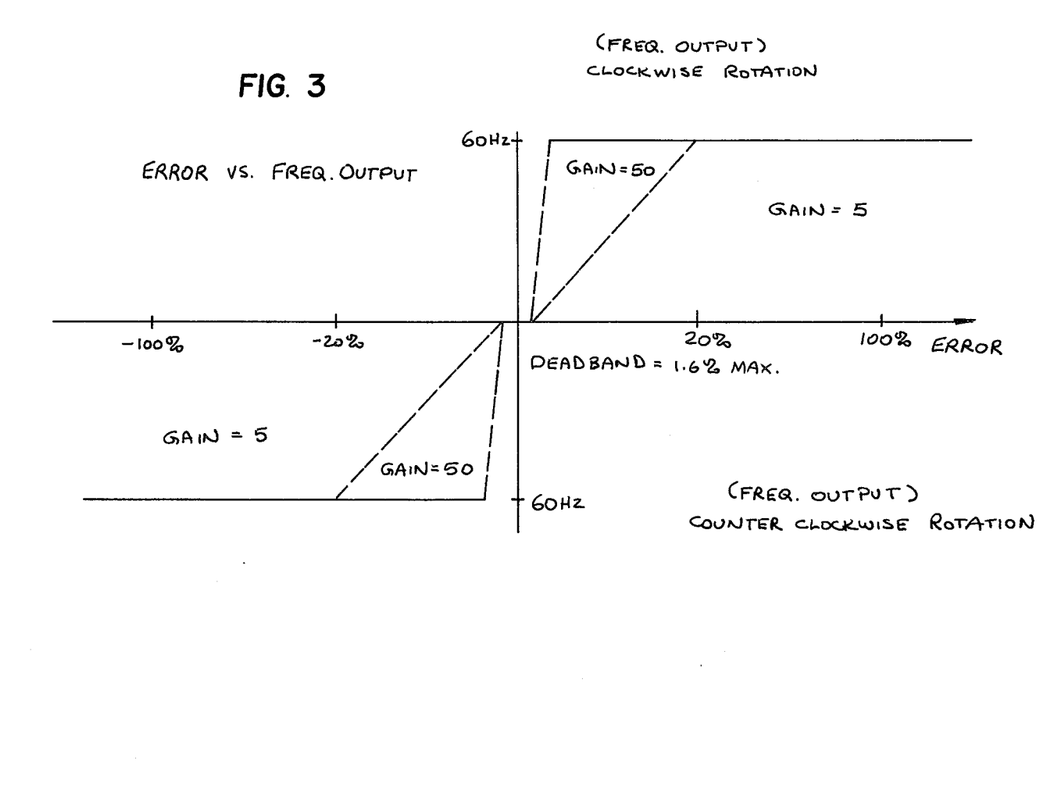
FIG. 3 is a graph illustrating the amount and direction of rotation of the three phase motor plotted against the frequency of pulses applied to the motor.

A proportional control algorithm resides in the PCM 32. The control algorithm has provisions for adjustable gain and deadband. The transfer function relating the frequency output of the PCM and the position error is shown in FIG. 3. This algorithm allows precise positioning with minimal or no overshoot. The relationship between output frequency and position error is as follows:

$$f_{OUT} = 0.6 \times GAIN \times (ERROR - DEADBAND)$$

where:

| ERROR = | SETPOINT – FEEDBACK; |
|---|---|
| SETPOINT = | DESIRED DRIVE POSITION; |
| FEEDBACK = | CURRENT DRIVE POSITION; |
| DEADBAND = | 0.4% to 1.6% (Adjustable); and |
| GAIN = | 5 to 50 (adjustable). |

The calculated driving frequency is a function of the position error. The actual frequency output is ramped up or down in 3 Hz increments until the calculated frequency is obtained. The frequency output is halted when the position error is less than the deadband. The frequency output is maximum (60 Hz) when the gain error product exceeds 100%.

The sign of the error determines the direction of motor rotation. A change in error sign indicates a change in motor rotational direction. The output frequency must be ramped down to a halt before changing direction and ramping toward the new desired driving frequency.

The PCM has three input modes for easy interface to a broad spectrum of automatic control systems. The modes are automatic-analog, automatic-pulse, and closed contact. The relationship of these three modes are shown in FIG. 4.

The closed contact mode 40 operates the drive as an open loop controller. The drive runs at full speed (60 Hz driving frequency) for the duration of the closed contact signal on a digital input. A closed contact up signal results in CCW motor rotation and a closed contact down signal results in CW motor rotation. A delay of 150 msec is provided when transferring from the contact mode to the automatic-analog mode 42, to allow transition time for the analog signal to stabilize before initiating closed loop control.

Figure 4:
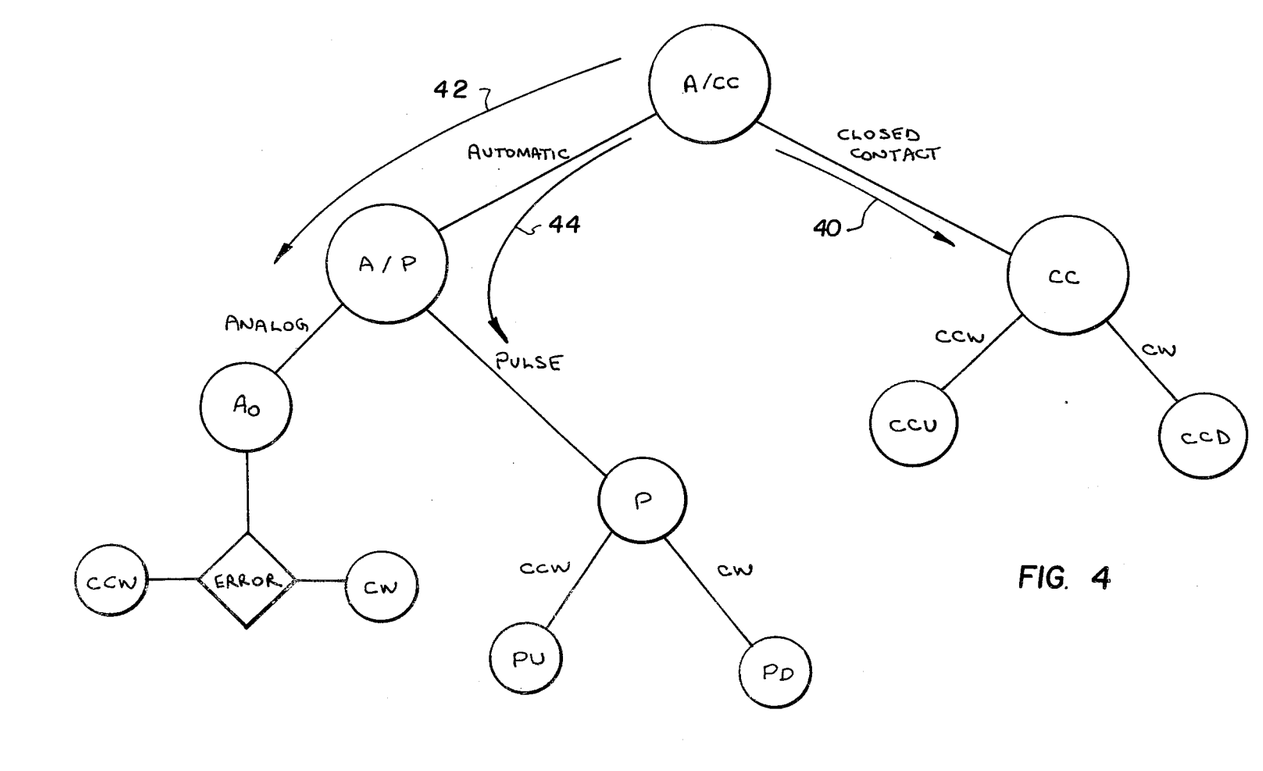
FIG. 4 is a flow chart illustrating the various modes of operation of the inventive positioner.

In FIG. 4 the symbols have the following meaning:
A/CC-Automatic Closed Contact;
A/P-Analog Pulse;
CC-Closed Contact;
A$_O$-Analog;
P-Pulse;
CCU-Closed Contact Up;
CCD-Closed Contact Down;
PU-Pulse Up;
PD-Pulse Down;
CW-Clockwise; and
CCW-Counterclockwise.

In the automatic-analog mode 42, the drive operates as a closed loop proportional controller. The analog inputs which represent the position demand and the actual position are expressed in terms of percent from 0 to 100 for the full span of the mechanical device. The error between these values determines the desired frequency output.

In the automatic-pulse mode 44, the direction of drive travel is determined by either the pulse up or pulse down signals. These digital inputs represent the percent change in desired position and are expressed as the pulse width of the digital signal, with 5 seconds being the full percentage change of span of the drive (100% change).

The PCM is controlled by 8 digital inputs and 4 analog inputs described below:

Digital Inputs

Automatic/closed contacts: With either the automatic or closed contact mode chosen, automatic mode requires either an analog or pulse input. Closed contact mode requires the motor to be run at a constant speed.

Analog/Pulse: Either the analog state or the pulse state must be chosen under automatic control.

Contact Up: This enables the motor to run at full speed counterclockwise.

Contact Down: This enables the motor to run at full speed clockwise.

Pulse Up: If activated when in the automatic pulse mode, the motor rotates clockwise until the new position is reached.

Pulse Down: If activated in the automatic pulse mode, the motor rotates counterclockwise until the new position is reached.

Limit Up: If activated under any mode the motor required to decelerate to stop. The drive will respond to a command to move in the opposite direction.

Limit Down: If activated under any mode the motor is required to decelerate to stop. The drive will respond to a command to move in the opposite direction.

Analog Inputs

Feedback: 0.75 to 5.25 volt signal corresponding to −5% to 105% of drive travel.

Setpoint: 0.75 to 5.25 volt signal corresponding to −5% to 105% of desired position.

Gain: 0.75 to 5.25 volt signal corresponding to a gain of 5 to 50.

Deadband: 0.75 to 5.25 volt signal corresponding to a deadband of 0.4% to 1.6%.

The Phase Driver Modules 34, 36, 28 are four quadrant high power bipolar switching amplifiers. Three phase drivers are required to constitute a 3 phase inverter bridge 50. The phase driver accepts the logic level PWM waveform over line 52, which is generated by the PCM and amplifies it to a power level capable of driving the induction motor 14 (7.5 KVA maximum).

The Phase Drive Output Stage consists of two banks of parallel bipolar transistors connected in a totem pole configuration across a 325 V dc bus. Either the upper or lower bank of transistors will be activated under control of the PCM at any given instant. Lockout logic prevents the upper and lower transistor banks from simultaneously activating due to noise or PCM failure.

The rate and time duration of the signals applied to the phase driver determine the frequency and average voltage applied to the motor 14.

The application of sinusoidal pulse width modulated wave forms to a standard 3 phase induction motor results in both speed and torque control of the motor. A standard three phase induction motor is essentially a single speed machine when supplied from power sources of fixed voltage and fixed frequency. For variable speed control, the supply frequency must be varied. In addition, the applied voltage must be varied in linear proportion to the supply frequency to maintain constant motor flux. At low frequencies, where the motor inductive reactance is low, boosted voltage must be used to compensate for the stator (IR) drop. The Three Phase Drive Controller 10 outputs 20 discrete frequencies to the motor from 0 to 60 Hz in 3 Hz increments.

Figure 5:
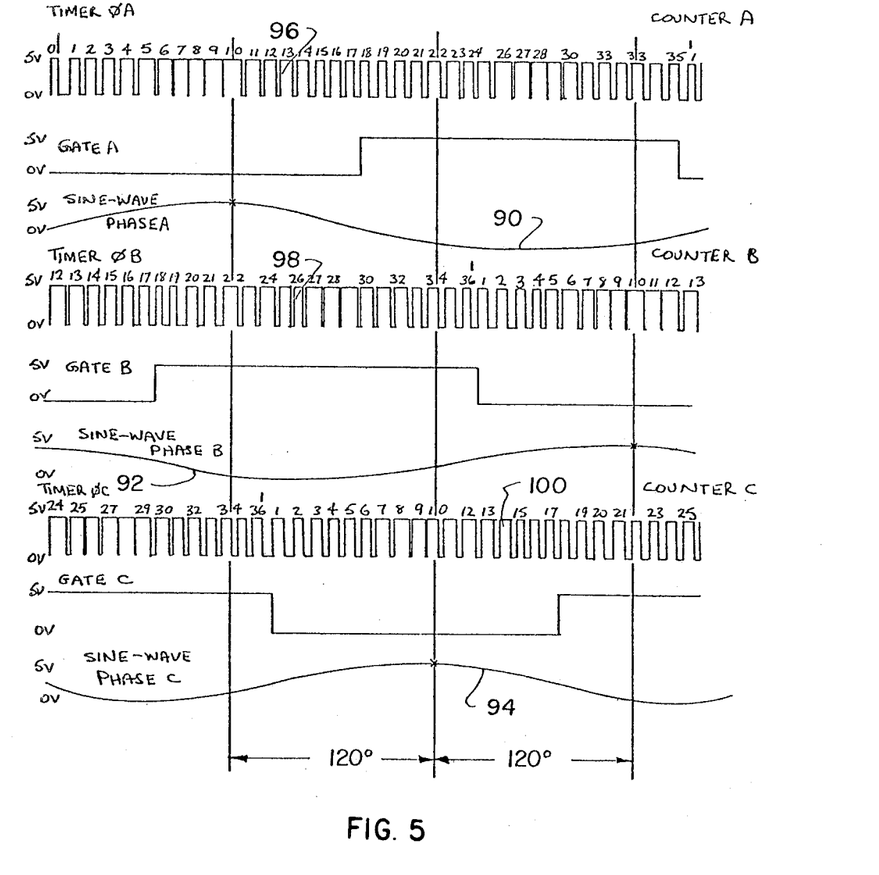
FIG. 5 is a diagram showing the three phase pulse modulated waveforms according to the invention.

The PWM waveform consists of a carrier frequency and a superimposed fundamental driving frequency. The superimposed driving frequency is sinusoidal and of the proper voltage magnitude to allow full torque output of the motor. Each half cycle of the fundamental frequency is divided into N segments. The duty cycle associated with each segment determines the average voltage corresponding to that segment. The changing of duty cycles for each sequential segment results in an average voltage waveform which is both sinusoidal and variable in amplitude. FIG. 5 shows a current and voltage waveform for one phase output demonstrating the sine weighted PWM technique.

The Motherboard 60 shown in FIG. 2, interconnects the PCM 32 and the Drivers 34, 36, 38, providing electrical connections between all circuits in the Three Phase Drive Controller 10. The circuits located on the Motherboard include the PCM power supply 62, 20 V dc power supply 64, overcurrent sensing circuits 66, and the DC crowbar circuit 68.

The PCM power supply 62 is a 20 KHz switching supply developing 5 V dc and 24 V dc for the digital and analog circuits of the PCM. The switching supply derives output from the 325 V dc bus 70. Input power to the switching supply is provided from the 20 V dc linear supply 64 also located on the Motherboard. The 20 V dc linear supply also provides power to the isolated switching supplies located on each 3 Driver assembly over line 72.

Two level current sensing circuit 66 monitors the instantaneous motor current in a load 74 of the common line 76. The first level of current detection generates an interrupt to the PCM 32, over line 78, indicating an overload condition. The output frequency is first reduced, but if the stalled load continues to exist, the Controller discontinues any output to the motor until a manual reset occurs. The second (higher) level of current detection indicates a failure of the inverter or motor 14. The DC crowbar 68 connected across the 325 V and common lines 70, 76 is immediately activated, reducing the bus voltage to a few volts until a 3 phase circuit breaker trips and disconnects input power. The DC crowbar is designed to protect the inverter components 50 and motor 14.

The 230 V ac input power 28 is full wave rectified in rectifier and filter 80, into 325 V nominal DC bus 70. The rectified voltage is filtered by a large capacitor bank before being applied to the inverter bridge 50. The rectifier bridge and capacitors and protected by the 3 phase circuit breaker in unit 80.

Figure 6:
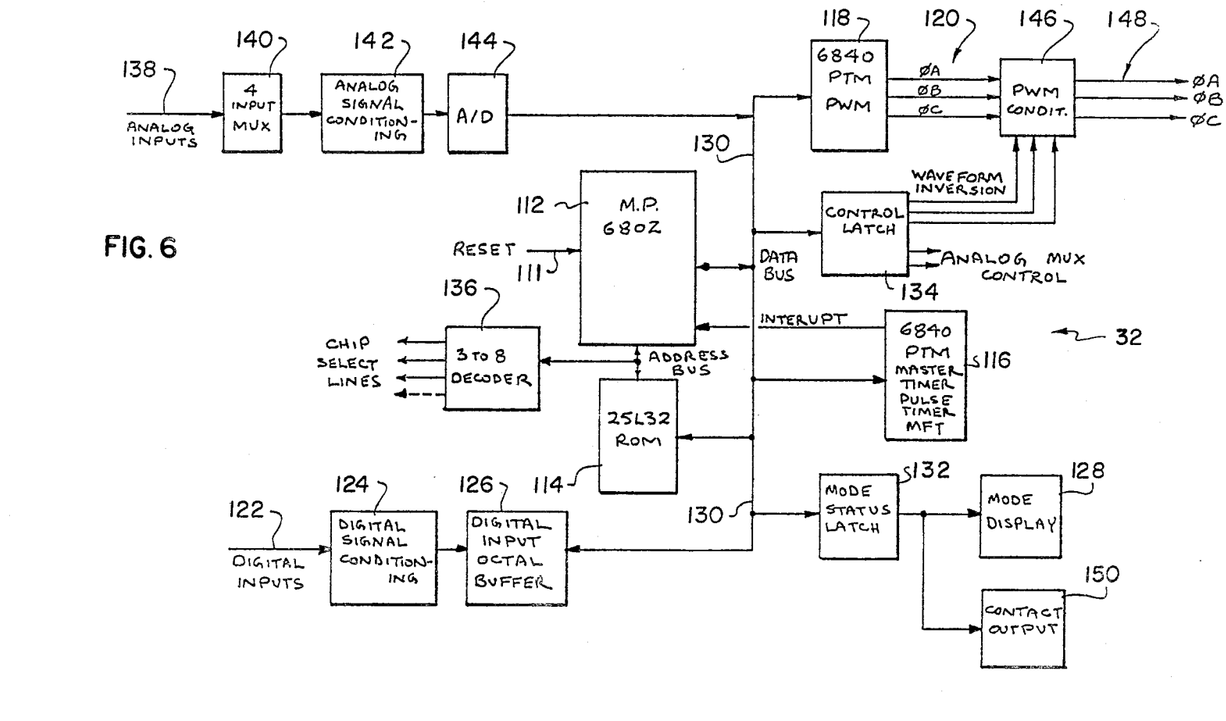
FIG. 6 is a block diagram showing details of the position control module utilized in the circuit of FIG. 2.

The inventive method is implemented by hardware and real time software, which is completely contained on a circuit card designated as the Position Control Module 32 in FIG. 6.

The Position Control Module provides the intelligence for the Three Phase Drive Controller. The PCM is a self-contained microcomputer which accepts control system inputs and, based on those inputs, develops logic level pulse wide modulated (PWM) waveforms which are applied to three power switching modules which are external to the PCM.

The PCM uses a MC6802 microprocessor 112 with up to 4K bytes of program storage. The processor is an interrupt driven machine with priority given to updating the real time 3 PWM waveform outputs to the induction motor. The remaining processor time is used to check control system inputs, perform calculations, and display controller status.

The functional diagram of the PCM hardware is shown in FIG. 6.

A microprocessor based system for three phase motor control is more versatile than a dedicated analog or digital logic design. The case of software modification allows the functional performance of the controller to be easily changed to a new application.

The microprocessor 112 used in the PCM as a central control unit is the Motorola 6802. The 6802 processor includes 128 bytes of RAM and an onboard system clock.

The control software requires approximately 3K bytes of memory. The software is stored in a 4K ultra violet erasable read only memory 114 such as a 25L32 or 27L32 device. These devices have access times of 450 nsec., which is sufficient for this application. The ROM addresses are located at the top of the memory from $F000 to $FFFF.

The control program uses only the 128 bytes of Ram located on the 6802 112. The RAM is used for buffers and variable storage. The RAM address locations are from $0000 to $007F.

The design includes two Motorola 6840 programmable timers modules 116 and 118 (PTM). Three individual timers are located on one LSI device. The timers are used to generate the output waveform pulse patterns at 120 measure time variant digital inputs, generate interrupts, and provide a machine fault time (MFT) function.

The timers (116, 118) are operated in the single shot mode. This mode allows a 16 bit binary number to be loaded into a timer latch. Count down is initiated through software or external logic control. A complete count down to 0 of the 16 bit binary number generates an interrupt, or changes the state of the output associated with that timer. The rate at which count down occurs is determined by the system clock or an external clock source.

Four timers (in 118) are dedicated to the generation of the three pulse width modulated waveforms 120. One timer is the master timer (in 116) which generates processor interrupts at a rate proportional to the output frequency of the controller. The interrupt routine updates, the other three timers, each dedicated to a phase output, with the new PWM waveform values.

The processor timer not associated with the interrupt routine is used to complete the main task of the control software to be described later. The use of the timers minimize the processor overhead associated with the generation of the PWM waveforms.

The digital system inputs 122 are all TTL logic level. The incoming digital inputs are all filtered at 124 to eliminate noise generated by the high power inverter circuitry. In addition, transient protection is provided to suppress electrical surges. The inputs are buffered and interfaced to the processor by an octal buffer 126.

Digital signals which are outputted by the processor 112 for control of the PWM waveform 120, mode status at latch 132, and analog multiplexing interface to their associated circuitry by octal latches. The octal latches are a low cost method of digital interface for a given dedicated application. The latch 132 dedicated to controller mode display 128 is configured to allow data bus information from line 130 to be displayed under program control. This feature is beneficial for both testing and analog calibrations at 150.

Latches, buffers, programmable timers, memory, and the analog to digital converter are all memory mapped by a 3 to 8 digital decoder 136. The decoder segments the memory into 8 addressable zones. All necessary logic has been included to insure the proper timing of data, address, and chip select lines.

A machine fault timer (MFT) in 116 has been provided on the PCM 32 to reset the processor 114 in the event a noise pulse or bad address disturbs the normal software execution. The MFT is updated by the processor during a regular known program sequence. The absence of this update implies a software failure. The MFT times out and resets the processor, reinitializing the system as will be described later.

Four analog signals at line 38, are recognized by the PCM 32. Two represent the gain and deadband control parameters which are generated internally by potentiometers. These parameters are associated with closed loop position control. They can easily be redefined in software for other applications. The remaining two are the setpoint and the feedback analog inputs which originate from a control system (FIG. 6). Each analog signal has the voltage range of 0.75 to 5.25 V dc. The feedback and setpoint signals, in addition, can be 4–20 mamp. signals which are converted to voltages by the PCM. The advantage of a current input signal is reduced noise and no attenuation due to long signal wires. The feedback signal is buffered and outputted to the control system for other control applications.

The four analog voltages are selected individually for A/D (analog to digital) conversion by an analog multiplexer 140 under processor control 142. The selected analog voltage is applied to a level shifter and filter 142 for proper signal conditioning before the 8 bit A/D conversion 144. The A/D converter 144 has an adjustable zero and span allowing maximum resolution for the given input voltage range. The span and zero are adjusted for allowing the 0.75 and 5.25 V dc input range (corresponds to −5% to 105% of variable) to convert from 0 to 255 counts of digital data. The A/D interfaces to the processors by internally contained three state buffers which are controlled by the processor 112.

Accurate conversions are possible by proper printed circuit layout and component selection. Reduction of digital noise generated by the microprocessor is reduced by separating the analog and digital ground returns, placement of components, and physically segregating all analog compnents from digital components. The component tolerances and temperature coefficients are selected such that an accuracy of more than 0.3% is maintained across the temperature range of 40° to 140° F.

The PWM waveform 120 which is outputted by the programmable timers is conditioned at 146 before being applied to the phase driver inputs 148. The activation of the positive and negative phase outputs are nonoverlapping to insure safe operation of the 3 phase inverter. A 24 microsecond dead time is created by a shift register and various logic elements. A processor controlled latch 134 generates waveform inversion signals which are combined with the timer outputs 120 to reduce the memory table associated with the waveforms by 50%. This same latch 134 has the capability to interrupt the waveform outputs instantly under program control. The conditioned waveform outputs are buffered by a darlington transistor package before leaving the PCM at 148.

Two hardware interrupts are generated for processor recognition. The most active interrupt is generated by the master timer 116. The master timer (also in 116) generates maskable interrupts proportional to the desired output frequency. The interrupt is electrically generated by the 6840 PTM 116. The second interrupt (overcurrent condition) is generated by circuitry external to the PCM. This interrupt is also processed by the maskable interrupt of the processor. The two interrupts are distinguished by polling the 6840 timer 116.

Figure 7:
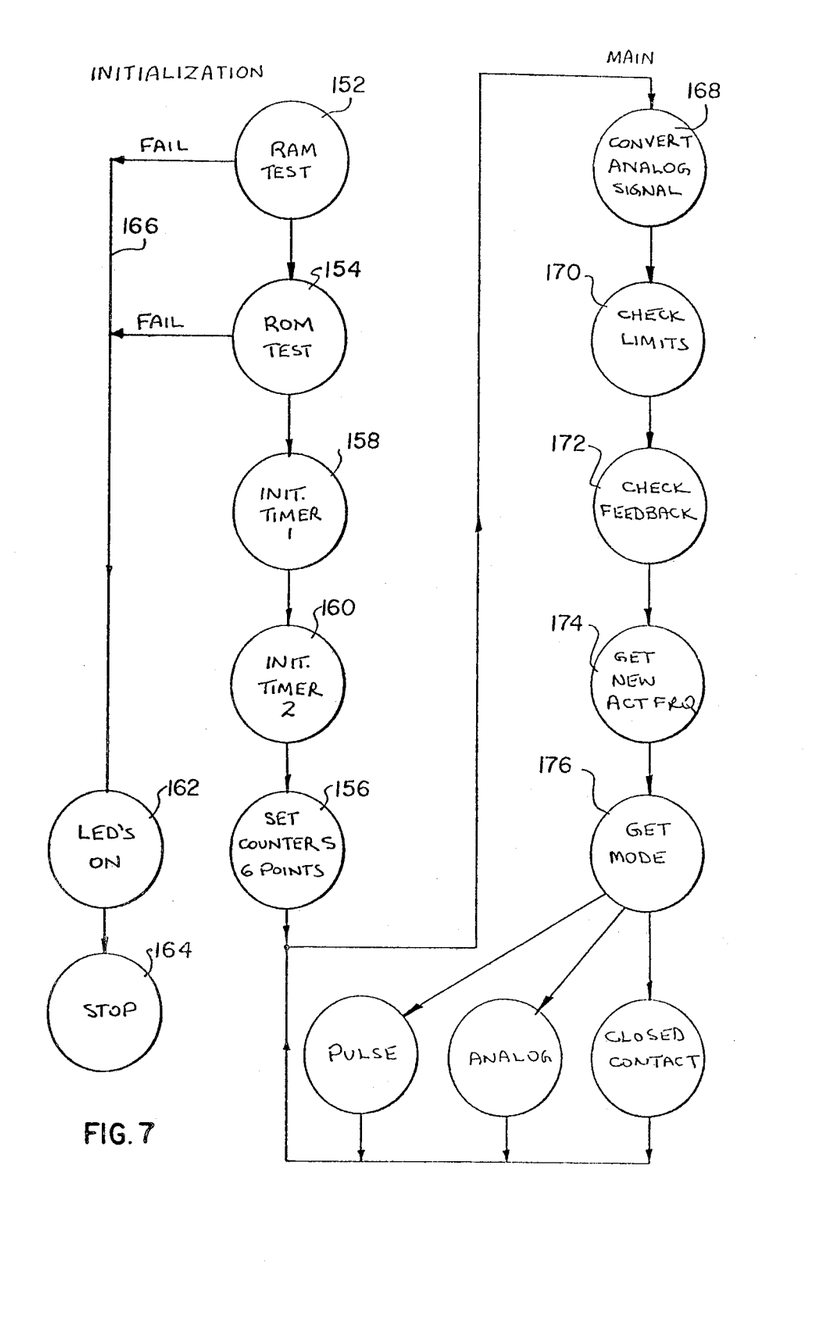
FIG. 7 is a flow chart showing the initializing and main tasks of a microprocessor programming according to the invention.
Figure 8:
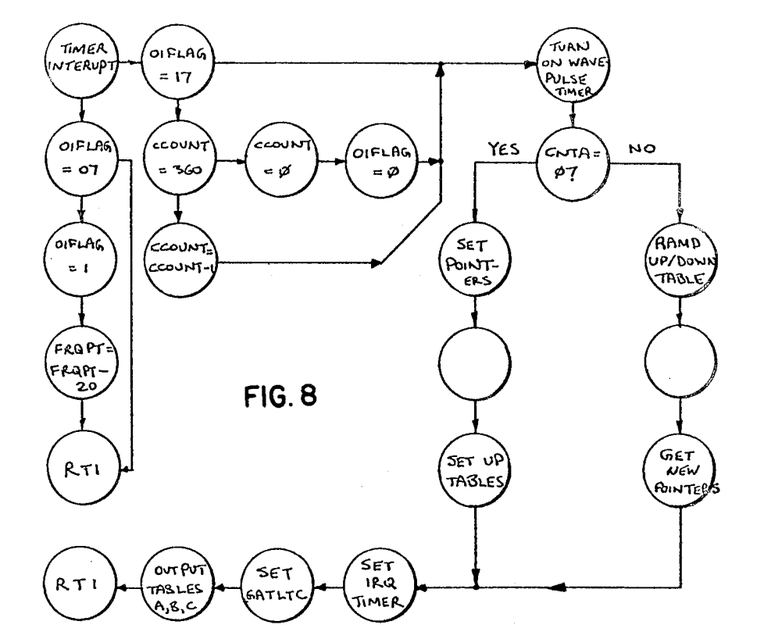
FIG. 8 is a flow chart of wave pulse and overcurrent processing tasks of the microprocessor programming.
Figure 9:
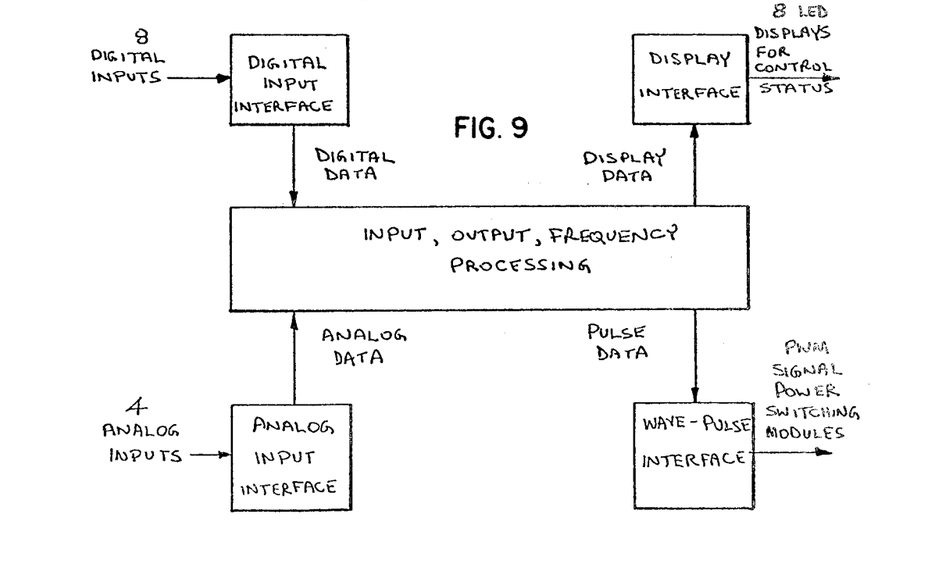
FIG. 9 is a block diagram illustrating the analog and digital interfaces to the microprocessor.

The functions of the microprocessor 112, according to the processor software, are as follows. The microprocessor must read inputs, decide what mode is being input, and process that mode. Then the processor must determine the proper frequency, and output this frequency via the programmable timer 118. FIGS. 7 and 8 show a state diagram overview of these functions. FIG. 9 shows the analog and digital interface to the processor. The processor software is written entirely in machine code to maximize processor time available for response to control system parameters.

After receiving a RESET input at 111, the microprocessor 112, as shown in FIG. 7, goes into a normal software reset—RAM test (152), ROM checksum test (154), setting of the stack pointer (156), initializing both programmable times (158, 160), setting up Machine Fault Timer, setting up pulse storage timer, and setting up the first IRQ timer value.

If either the RAM or ROM test fail (line 166), the processor turns all LEDs (162) on and stops (164).

The main task of the processor 112, handles analog conversions, checks limit conditions, checks feedback, ramps of frequency, and checks the mode of operation.

In this section (168), the processor 112 converts the analog signals. The analog signals are converted to hexadecimal and stored in RAM for use later. Each analog signal thus converted, is determined by the input of the mulitplexer 140.

Next, limit checking occurs (170). If either limit is set (up or down), the DESFRQ (Desired Frequency) is set to zero. Then, as long as a limit is set, the DESFRQ equals zero only in the direction of the limit. This causes the motor to be able to run in the opposite direction of the limit condition. The limit inputs can be externally configured to provide system control of the motor.

Next, feedback checking occurs (172). One function of this section is to insure that the drive frame moves when a frequency is outputted by the controller. No drive movement indicates a jammed drive frame or process element. This condition disables the controller. Another function of this section is to determine maximum allowable frequency (DESFRQ) output throughout the span of the drive.

The ramping of frequency (174) only occurs after so many passes of the wave pulse output. When the actual frequency (ACTFRQ) is to be ramped, the processor decides if the actual direction (ACTDIR) is equal to the desired direction (DESDIR). If the directions are not equal, the ACTFRQ must be ramped down to $\phi$ Hz (motor stopped) before the directions can be set equal. Once the directions are set equal, the processor decides whether to ramp the frequency or not, and if so, in which direction. The following tests are made and the results are as follows:

| | |
|---|---|
| ACTFRQ = DESFRQ | ACTFRQ = ACTFRQ |
| ACTFRQ > DESFRQ | ACTFRQ = ACTFRQ − 3 |

-continued

| | |
|---|---|
| ACTFRQ < DESFRQ | ACTFRQ = ACTFRQ + 3 |

Then a pointer is set up at the beginning of the proper table of ACTFRQ.

The next task is mode selection (176). This portion of the real time software can be configured to allow control of a particular application. This section of the software will contain all applicable control algorithms for a given application. The ACTFRQ and DESFRQ values are determined in this portion of the software.

The IRQ interrupt is used for an over-current condition and wave-pulse output, as shown in FIG. 8. Over-current condition is noted by hardware, which gives the processor an IRQ interrupt. The response of the processor to an over-current interrupt is dependent on the application. If the over-current condition is determined undesirable, the motor is turned off and a manual RESET must occur to INITIALIZE the controller again.

The desired outputs are three sine waves 90, 92, 94 in FIG. 5, which are used to drive the three phases of a three-phase induction motor. The three sine waves either lead or lag each other by 120° per phase. A reverse in the phasing of the sine waves results in a reverse in the direction of the motor.

The establishment of the square pulse patterns 96, 98, 100, leading to the superimposed sine wave is known as pulse width modulation. Twenty-four, thirty-six, seventy-two or one-hundred and forty-four equal pulses (frequency determining the number) with varying "on-times" are used to generate the sine wave of the desired frequency. The number of pulses per cycle can be altered for any given frequency under software control. Thirty-six pulses are used in FIG. 5. The "on-time" for each pulse is calculated from the following formula:

$$T = \left[ \frac{1}{2fI} + \frac{V\sin\theta}{650fI} \right] 1{,}000{,}000$$

where:
T = time in microseconds
f = fundamental frequency (3 through 60 Hz in 3 Hz increments)
θ = phase angle in degrees (2.5°, 5.0°, 10°, or 15° increments from 0° to 90° depending on fundamental frequency)
I = increments per cycle

| | | |
|---|---|---|
| f = | 3,6 Hz I = | 144 |
| f = | 9, 12, 15, Hz I = | 72 |
| f = | 18 thru 45 Hz I = | 36 |
| f = | 48 thru 60 Hz I = | 24 |

V = desired peak voltage in volts (adjusted for maximum motor torque).

FIG. 5 shows the pulse pattern sine wave relationship. The negative half of the sine wave is derived from the complement of this signal.

The method for each of the three phase waveforms is the same. The ROM 114 contains 20 different tables. Each table corresponds to a different output waveform frequency (ranging from 3 to 60 Hz in 3 Hz increments). The entries in each table are the programmable timer values necessary to create 90 degrees of a 360 degree PWM sine wave. The entire sine wave is created by repeating the entries in the table in the proper sequence and proper control of the waveform inversion control lines outputted by latch 134. Only one table is necessary to generate all three phase outputs. The individual phases require the same timer values for a given frequency. It is just necessary to displace the three waveforms by 120° with respect to each other.

The programmable timer values located in each frequency table do not necessarily have to be sine weighted. The timer values can be changed to provide non-sinusoidal waveforms to achieve greater average voltage output resulting in a different motor torque relationship.

The method used in creating this sine wave is the same whether 24, 36, 72, or 144 pulses per cycle are outputted.

Initialization of each waveform is approximately the same. The counters and pointers are set up, inversion latch set, and IRQ time is determined. Table I shows the initialization of counters and pointers for each number of pulses. PNTA, PNTB, and PNTC are the pointers for the three phases A, B, and C; FRQPT is frequency point; and, CNTA, CNTR, and CNTC are the counts for the three phases.

The output for each phase is similar regardless of the number of pulses. A 36 pulse output will be shown in more detail.

The pointers move up and down the table depending on the value of the counter that it is associated with. See Tables II and III for an example of this. A gate is also set or reset, depending on the count of the counter for each phase. When the counter reaches its limit, it is set to zero and the process starts over again.

Frequency change can only occur when CNTA=$\phi$.
IRQ time is determined by:

$$IRQ \text{ Time (microseconds)} = \left( \frac{1}{\# \times \text{freq.}} \times 10^6 \right) - 290$$

where:
\# = number of pulses per frequency.
The IRQ time is loaded into a programmable timer module and this determines the rate of IRQ interrupts.

TABLE I

| 24 Pulses | | | | |
|---|---|---|---|---|
| | PNTA | = FRQPT > | CNTA = | $\phi$ |
| | PNTB | = FRQPT > + | 8 CNTB = | 8 |
| | PNTC | = FRQPT > + | 8 CNTC = | 16 |
| 36 Pulses | | | | |
| | PNTA | = FRQPT > | CNTA = | $\phi$ |
| | PNTB | = FRQPT > + | 12 CNTB = | 12 |
| | PNTC | = FRQPT > + | 12 CNTC = | 24 |
| 72 Pulses | | | | |
| | PNTA | = FRQPT > | CNTA = | $\phi$ |
| | PNTB | = FRQPT > + | 24 CNTB = | 24 |
| | PNTC | = FRQPT > + | 24 CNTC = | 48 |
| 144 Pulses | | | | |
| | PNTA | = FRQPT > | CNTA = | $\phi$ |
| | PNTB | = FRQPT > + | 48 CNTB = | 48 |
| | PNTC | = FRQPT > + | 48 CNTC = | 96 |

TABLE II

| Table | Count | | | |
|---|---|---|---|---|
| XX (A) | $\phi$ [A] | 18 | | 36 = $\phi$ |
| XX | 1 | 17 | 19 | 35 |
| XX | 2 | 16 | 20 | 34 |
| XX | 3 | 15 | 21 | 33 |
| XX | 4 | 14 | 22 | 32 |
| XX | 5 | 13 | 23 | 31 |

TABLE II-continued

| Table | Count | | | |
|---|---|---|---|---|
| XX (B) (C) | 6 | 12 [B] | 24 [C] | 30 |
| XX | 7 | 11 | 25 | 29 |
| XX | 8 | 10 | 26 | 28 |
| XX | 9 | | 27 | | at start:  CNT [A] = 8   PNT (A) = 6
         CNT [B] = 12   PNT (B) = 6
         CNT [C] = 24   PNT (C) = 6.

Pointers (PNT) (B) and (C) start at the same location but more in opposite directions because of CNT values.

TABLE III

| Counter | Pointer Movement | Gate |
|---|---|---|
| $\phi$–9 | inc ↓ | $\phi$ pos |
| 10–18 | dec ↑ | $\phi$ pos |
| 19–27 | inc ↓ | 1 neg |
| 28–36 | dec ↑ | 1 neg |

The time required to process an IRQ interrupt directly affects the overall system response of the PCM 32. The IRQ routine is given top priority to allow the real time PWM waveform outputs 148 to continue without interruption. The IRQ execution time is reduced by the use of efficient machine instructions at the expense of increased memory locations necessary to store the IRQ routine.

An increase of PWM output frequency resolution for more precise control applications can be obtained by increasing the number of frequency tables located in the ROM. The system response will not be significantly decreased by the addition of more output frequencies.

We claim:
1. A three phase variable frequency constant torque controller for a high torque servo positioner comprising:
    an inverter including a plurality of drivers for generating a plurality of AC signals which are mutually out of phase and which are applied to the servo positioner, each driver generating an AC signal corresponding to a pulse width modulated waveform;
    a power supply connected to said drivers for applying a filtered and rectified DC voltage to said drivers;
    an overcurrent detector connected to said drivers for detecting a current above a selected limit in said AC signals; and
    a position control module connected to said drivers for generating said pulse width modulated waveforms and for receiving a signal from the servo positioner indicating a position thereof, said position control module adapted to receive digital signals and analog signals, said analog signals corresponding to gain, set point, feedback and dead band signals for the servo positioner;
    said position control module comprising a programmable microprocessor, a read only memory connected to said microprocessor for carrying a plurality of tables corresponding to said plurality of pulse width modulated signals, an analog to digital converter for receiving the analog signals and converting them to digital signals readable by said microprocessor, a plurality of timers connected to said microprocessor for generating said pulse width modulated signals and for generating interrupt signals, said position control module connected to said overcurrent detector for initiating an interrupt signal upon detection of an overcurrent.

* * * * *